United States Patent
Hirata et al.

(10) Patent No.: US 7,126,812 B2
(45) Date of Patent: Oct. 24, 2006

(54) SOLID ELECTROLYTIC CAPACITOR METHOD OF MANUFACTURING THE SAME

(75) Inventors: Yoshikazu Hirata, Daito (JP); Tetsuro Iwasa, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/248,202

(22) Filed: Oct. 13, 2005

(65) Prior Publication Data

US 2006/0082951 A1 Apr. 20, 2006

(30) Foreign Application Priority Data

Oct. 15, 2004 (JP) .............................. 2004-301281

(51) Int. Cl.
*H01G 4/06* (2006.01)
*H01G 9/02* (2006.01)

(52) U.S. Cl. ...................... 361/524; 361/525; 361/528; 29/25.03

(58) Field of Classification Search ................ 361/523, 361/524, 525, 528; 29/25.03
See application file for complete search history.

(56) References Cited

U.S. PATENT DOCUMENTS 5,124,022 A * 6/1992 Evans et al. ................ 205/175
5,729,428 A * 3/1998 Sakata et al. ............... 361/523

FOREIGN PATENT DOCUMENTS

| JP | 2-74021 | 3/1990 |
|---|---|---|
| JP | 4-73924 | 3/1992 |
| JP | 8-293436 | 11/1996 |

\* cited by examiner

*Primary Examiner*—Eric W. Thomas
(74) *Attorney, Agent, or Firm*—Armstrong, Kratz, Quintos, Hanson & Brooks, LLP (57) ABSTRACT

A solid electrolytic capacitor using a conductive polymer compound as a solid electrolyte includes an anode body, a dielectric oxide coating formed on a surface of the anode body, a sulfone group-containing silanol derivative layer formed on at least a portion of the dielectric oxide coating by a coupling reaction, and a conductive polymer compound layer formed at least on the sulfone group-containing silanol derivative layer. With this, a solid electrolytic capacitor having a low ESR and a high capacitance and a method of manufacturing the solid electrolytic capacitor can be provided.

11 Claims, 3 Drawing Sheets

SOLID ELECTROLYTIC CAPACITOR METHOD OF MANUFACTURING THE SAME

BACKGROUND OF THE INVENTION

1. Field of the Invention

The present invention relates to a solid electrolytic capacitor including a conductive polymer compound as a solid electrolyte and a method of manufacturing the solid electrolytic capacitor.

2. Description of the Background Art

In connection with size and weight reductions of electric equipment in recent years, a small capacitor of a large capacity for high frequencies has come to be required. As such a capacitor, a solid electrolytic capacitor using a conductive polymer compound to form a solid electrolyte layer has been proposed.

The solid electrolytic capacitor has a problem of a decrease in adhesion between a dielectric oxide coating, which is an inorganic material layer formed by oxidation of a surface of an anode body formed with a sintered body of a valve metal such as tantalum, niobium, titanium, or aluminum, and a solid electrolyte layer which is an organic material layer (a conductive polymer compound layer) formed on the dielectric oxide coating, which results in an increased leaked current, an increased ESR (Equivalent Series Resistance) and decreased reliability.

Therefore, when the conductive polymer compound layer is formed on the dielectric oxide coating, a partial conductive polymer compound layer covering a portion of the dielectric oxide coating is generally formed beforehand by chemical oxidative polymerization, and then a full-scale conductive polymer compound layer covering a whole surface of the dielectric oxide coating is formed by electrolytic oxidative polymerization. The adhesion between the dielectric oxide coating and the conductive polymer compound layer, however, is insufficient even when the conductive polymer compound layer is formed as such.

To solve the problem, a method for increasing the adhesion between the dielectric oxide coating and the conductive polymer compound layer has been proposed, which includes steps of forming the dielectric oxide coating on the surface of the anode body, treating a surface thereof with a silane coupling agent, and then forming on the surface the conductive polymer compound layer as a solid electrolyte layer to let the silane coupling agent be interposed between the dielectric oxide coating and the conductive polymer compound layer (for example, see Japanese Patent Laying-Open Nos. 02-074021, 04-073924 and 08-293436).

Though the adhesion between the dielectric oxide coating and the conductive polymer compound layer is increased with existence of the silane coupling agent, current collection by the conductive polymer compound layer is inhibited because the silane coupling agent itself is an insulator, and therefore the ESR is increased and a capacitance is decreased.

SUMMARY OF THE INVENTION

An object of the present invention is to provide a solid electrolytic capacitor having a low ESR and a high capacitance and a method of manufacturing the solid electrolytic capacitor.

According to an aspect of the present invention, a solid electrolytic capacitor using a conductive polymer compound as a solid electrolyte includes an anode body, a dielectric oxide coating formed on a surface of the anode body, a sulfone group-containing silanol derivative layer formed on at least a portion of the dielectric oxide coating by a coupling reaction, and a conductive polymer compound layer formed at least on the sulfone group-containing silanol derivative layer.

According to another aspect of the present invention, a method of manufacturing a solid electrolytic capacitor using a conductive polymer compound as a solid electrolyte includes the steps of forming a dielectric oxide coating on a surface of an anode body, performing a coupling reaction of a silanol derivative containing a functional group forming a sulfone group by oxidation with at least a portion of the dielectric oxide coating, and oxidizing the silanol derivative containing the functional group to form a sulfone group-containing silanol derivative.

In the method of manufacturing a solid electrolytic capacitor according to the present invention, oxidation of the silanol derivative containing the functional group can be performed by achieving contact between the silanol derivative containing the functional group and an oxidizing agent, or by electrochemically oxidizing the silanol derivative containing the functional group in an electrolyte solution. The functional group of the silanol derivative can be a mercapto group. Furthermore, the silanol derivative containing the functional group can be 3-mercaptopropylmethyldimethoxysilane or 3-mercaptopropyltrimethoxysilane.

According to the present invention, a solid electrolytic capacitor having a low ESR and a high capacitance and a method of manufacturing the solid electrolytic capacitor can be provided by forming the silanol derivative having ionic conductivity between the dielectric oxide coating and the conductive polymer compound layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
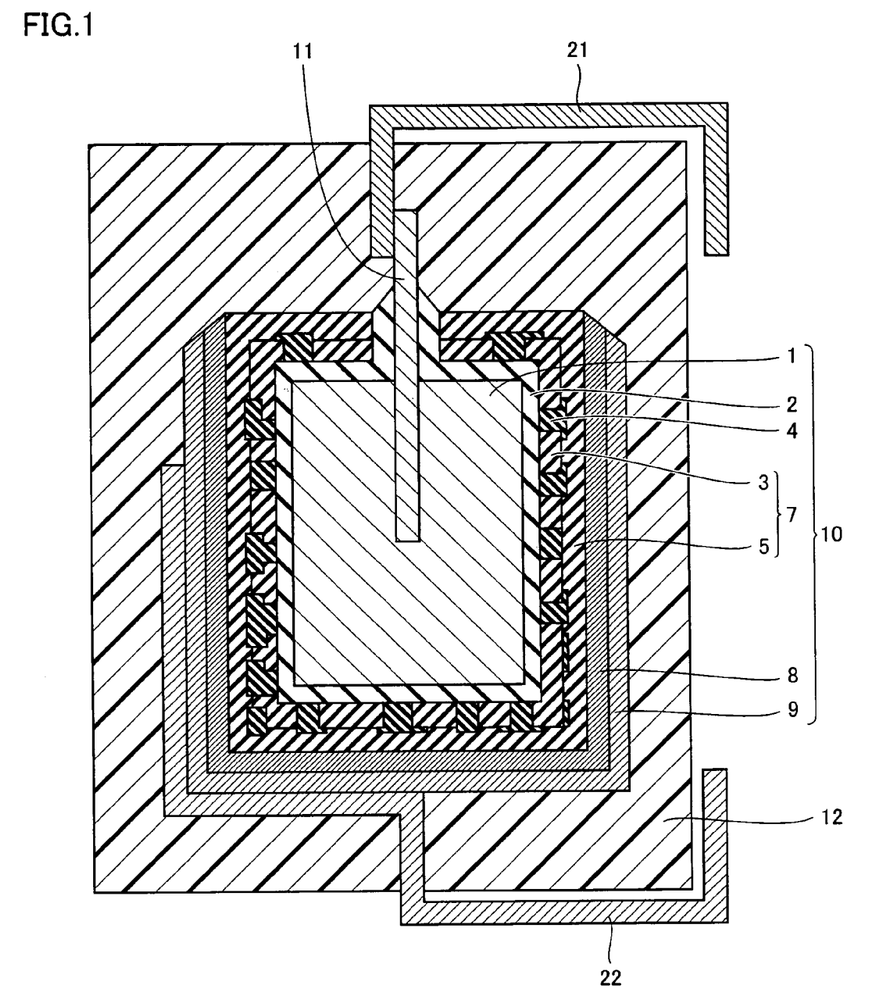
FIG. 1 is a schematic cross-sectional view of a solid electrolytic capacitor according to the present invention.
Figure 2:
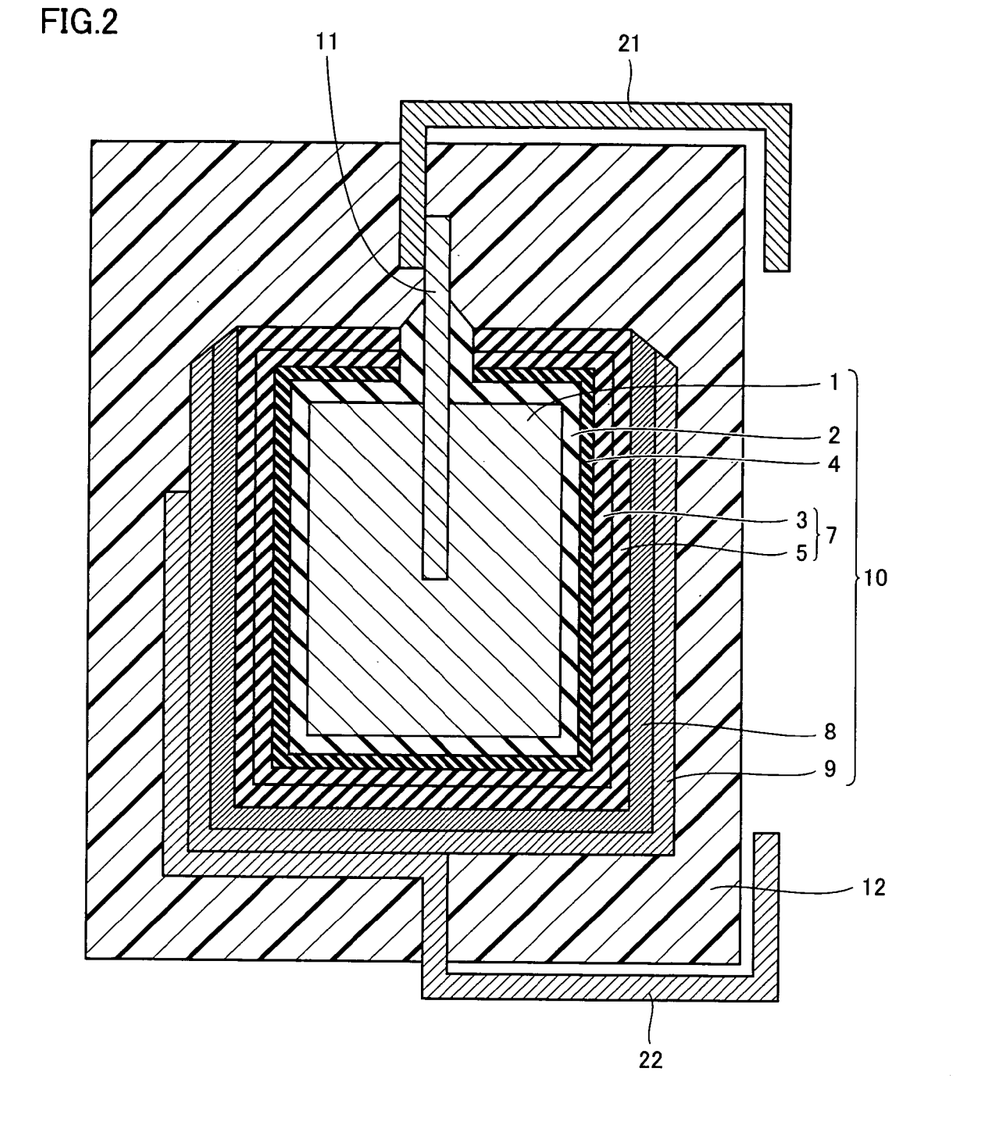
FIG. 2 is a schematic cross-sectional view of another solid electrolytic capacitor according to the present invention.

Referring to FIG. 1 or 2, a solid electrolytic capacitor according to the present invention uses a conductive polymer compound as a solid electrolyte, and includes an anode body 1, a dielectric oxide coating 2 formed on a surface of anode body 1, a sulfone group-containing silanol derivative layer 4 formed on at least a portion of dielectric oxide coating 2 by a coupling reaction, and a conductive polymer compound layer 7 formed at least on sulfone group-containing silanol derivative layer 4.

Since sulfone group-containing silanol derivative layer 4 has ionic conductivity, adhesion between the dielectric oxide coating and the conductive polymer compound layer can be increased without inhibiting current collection by the conductive polymer compound layer by forming sulfone group-containing silanol derivative layer 4 between dielectric oxide coating 2 and conductive polymer compound layer 7, which results in a solid electrolytic capacitor having a low ESR and a high capacitance.

It is to be noted that, FIGS. 1 and 2 are schematic cross-sectional views for facilitating understanding of the solid electrolytic capacitor, and a dimension of each portion is different from an actual dimension. In particular, dielectric oxide coating 2, silanol derivative layer 4, conductive polymer compound layer 7, a carbon layer 8 and a cathode extraction layer 9 are illustrated with larger thicknesses.

Details of a solid electrolytic capacitor according to the present invention will now be described. Referring to FIG. 1, on a surface of anode body 1 formed with a sintered body of a valve metal such as tantalum, niobium, titanium, or aluminum, dielectric oxide coating 2 is formed by oxidizing the surface of anode body 1, then a first conductive polymer compound layer 3 is formed on a portion of dielectric oxide coating 2, sulfone group-containing silanol derivative layer 4 formed by a coupling reaction is provided on a portion of dielectric oxide coating 2 on which first conductive polymer compound layer 3 is not formed, and a second conductive polymer compound layer 5 is formed on whole surfaces of first conductive polymer compound layer 3 and sulfone group-containing silanol derivative layer 4. Conductive polymer compound layer 7 formed with first conductive polymer compound layer 3 and second conductive polymer compound layer 5 corresponds to a solid electrolyte layer.

In the solid electrolytic capacitor, though sulfone group-containing silanol derivative layer 4 is sometimes formed not only on dielectric oxide coating 2 but also on first conductive polymer compound layer 3 as shown in FIG. 1, current collection by conductive polymer compound layer 7 is hardly inhibited because sulfone group-containing silanol derivative layer 4 has ionic conductivity.

Details of another solid electrolytic capacitor according to the present invention will now be described. Referring to FIG. 2, on a surface of anode body 1 formed with a sintered body of a valve metal such as tantalum, niobium, titanium, or aluminum, dielectric oxide coating 2 is formed by oxidizing the surface of anode body 1, then sulfone group-containing silanol derivative layer 4 formed by a coupling reaction is provided on dielectric oxide coating 2, and first conductive polymer compound layer 3 and second conductive polymer compound layer 5 are successively formed on sulfone group-containing silanol derivative layer 4. Conductive polymer compound layer 7 formed with first conductive polymer compound layer 3 and second conductive polymer compound layer 5 corresponds to a solid electrolyte layer. Though two layers of first conductive polymer compound layer 3 and second conductive polymer compound layer 5 are formed as conductive polymer compound layer 7 in FIG. 2, conductive polymer compound layer 7 can also be formed with one layer.

Referring to FIG. 1 or 2, in each of the above two solid electrolytic capacitors, carbon layer 8 containing conductive carbon is further formed on conductive polymer compound layer 7, and cathode extraction layer 9 formed with silver paste or the like is formed on carbon layer 8 to construct a capacitor element 10. Furthermore, an anode terminal 21 is connected to an anode lead member 11 inserted into anode body 1 from one end surface thereof, a cathode terminal 22 is connected to cathode extraction layer 9, and capacitor element 10 is covered and sealed with an exterior resin 12 such as an epoxy resin.

Though a conductive polymer compound forming conductive polymer compound layer 7 is not specifically limited, polypyrrole, polythiophene or the like is preferably used in terms of easiness of polymerization and stability of the conductive polymer compound.

It is to be noted that, the sulfone group-containing silanol derivative included in the solid electrolytic capacitor can be detected with IR (infrared absorption spectroscopy), NMR (nuclear magnetic resonance), XPS (X-ray photoelectron spectroscopy), or the like.

Referring to FIG. 1 or 2, a method of manufacturing a solid electrolytic capacitor using a conductive polymer compound as a solid electrolyte according to the present invention includes the steps of forming dielectric oxide coating 2 on a surface of anode body 1, performing a coupling reaction of a silanol derivative containing a functional group forming a sulfone group by oxidation with at least a portion of dielectric oxide coating 2, and oxidizing the silanol derivative containing the functional group to form a sulfone group-containing silanol derivative.

Since sulfone group-containing silanol derivative layer 4 is formed between dielectric oxide coating 2 and conductive polymer compound layer 7 with the method of manufacturing a solid electrolytic capacitor described above, adhesion between dielectric oxide coating 2 and conductive polymer compound layer 7 can be increased without inhibiting current collection by conductive polymer compound layer 7, which results in a solid electrolytic capacitor having a low ESR and a high capacitance.

The silanol derivative used in the method of manufacturing a solid electrolytic capacitor according to the present invention contains a functional group which forms a sulfone group by oxidation, and undergoes a coupling reaction (is a coupling agent) with the dielectric oxide coating. Though the functional group forming a sulfone group by oxidation is not specifically limited, a mercapto group is preferred because it is highly hydrophilic and easily oxidized. In addition, though the silanol derivative containing the mercapto group is not specifically limited, 3-mercaptopropylmethyldimethoxysilane or 3-mercaptopropyltrimethoxysilane is preferred in terms of high water solubility and high reactivity.

Though the step of oxidizing the silanol derivative containing the functional group forming a sulfone group by oxidation in the method of manufacturing a solid electrolytic capacitor according to the present invention is not specifically limited, the step is preferably performed by achieving contact between the silanol derivative containing the functional group forming a sulfone group by oxidation and an oxidizing agent, or by electrochemically oxidizing the silanol derivative containing the functional group forming a sulfone group by oxidation in an electrolyte solution.

Though a method for achieving contact between the silanol derivative containing the functional group forming a sulfone group and the oxidizing agent is not specifically limited, it may be performed by, for example, immersing in a solution including the oxidizing agent an element including the silanol derivative layer formed on a portion of the dielectric oxide coating. Hydrogen peroxide, nitric acid, trifluoroacetic acid, or the like is used as the oxidizing agent.

In addition, though a method for electrochemically oxidizing the silanol derivative containing the functional group forming a sulfone group by oxidation in an electrolyte solution is not specifically limited, it may be performed by, for example, immersing in the electrolyte solution including an oxidizing agent an element including the silanol derivative layer formed on a portion of the dielectric oxide coating as an anode and performing electrolysis. As the electrolyte solution, a phosphoric acid solution, a polymerization solution for forming the conductive polymer compound layer by electrolytic oxidative polymerization, or the like is used.

Referring to FIG. 1, a detailed method of manufacturing a solid electrolytic capacitor according to the present invention includes the steps of forming dielectric oxide coating 2 on a surface of anode body 1, forming first conductive polymer compound layer 3 on a portion of dielectric oxide coating 2, performing a coupling reaction of a silanol derivative containing a functional group forming a sulfone group by oxidation with a portion of dielectric oxide coating 2 on which first conductive polymer compound layer 3 is not formed, oxidizing the silanol derivative containing the functional group to form a sulfone group-containing silanol derivative, and forming second conductive polymer compound layer 5 on sulfone group-containing silanol derivative layer 4 obtained as such and first conductive polymer compound layer 3.

Referring to FIG. 2, a detailed method of manufacturing another solid electrolytic capacitor according to the present invention includes the steps of forming dielectric oxide coating 2 on a surface of anode body 1, performing a coupling reaction of a silanol derivative containing a functional group forming a sulfone group by oxidation with dielectric oxide coating 2, oxidizing the silanol derivative containing the functional group to form a sulfone group-containing silanol derivative, and forming first conductive polymer compound layer 3 and second conductive polymer compound layer 5 on sulfone group-containing silanol derivative layer 4 obtained as such. It is to be noted that, though a situation is described in FIG. 2 in which conductive polymer compound layer 7 is formed in two steps with first conductive polymer compound layer 3 and second conductive polymer compound layer 5, conductive polymer compound layer 7 can also be formed in one step with one layer.

In each of the aforementioned two methods of manufacturing a solid electrolytic capacitor, the step of oxidizing the silanol derivative containing the functional group forming a sulfone group by oxidation to form a sulfone group-containing silanol derivative and the step of forming the conductive polymer compound layer on the sulfone group-containing silanol derivative layer can be concurrently performed. More specifically, the sulfone group-containing silanol derivative layer and the conductive polymer compound layer can be concurrently formed by immersing an element having the silanol derivative layer containing the functional group formed thereon as a cathode in a polymerization solution for forming the conductive polymer compound layer by electrolytic oxidative polymerization.

Figure 3:
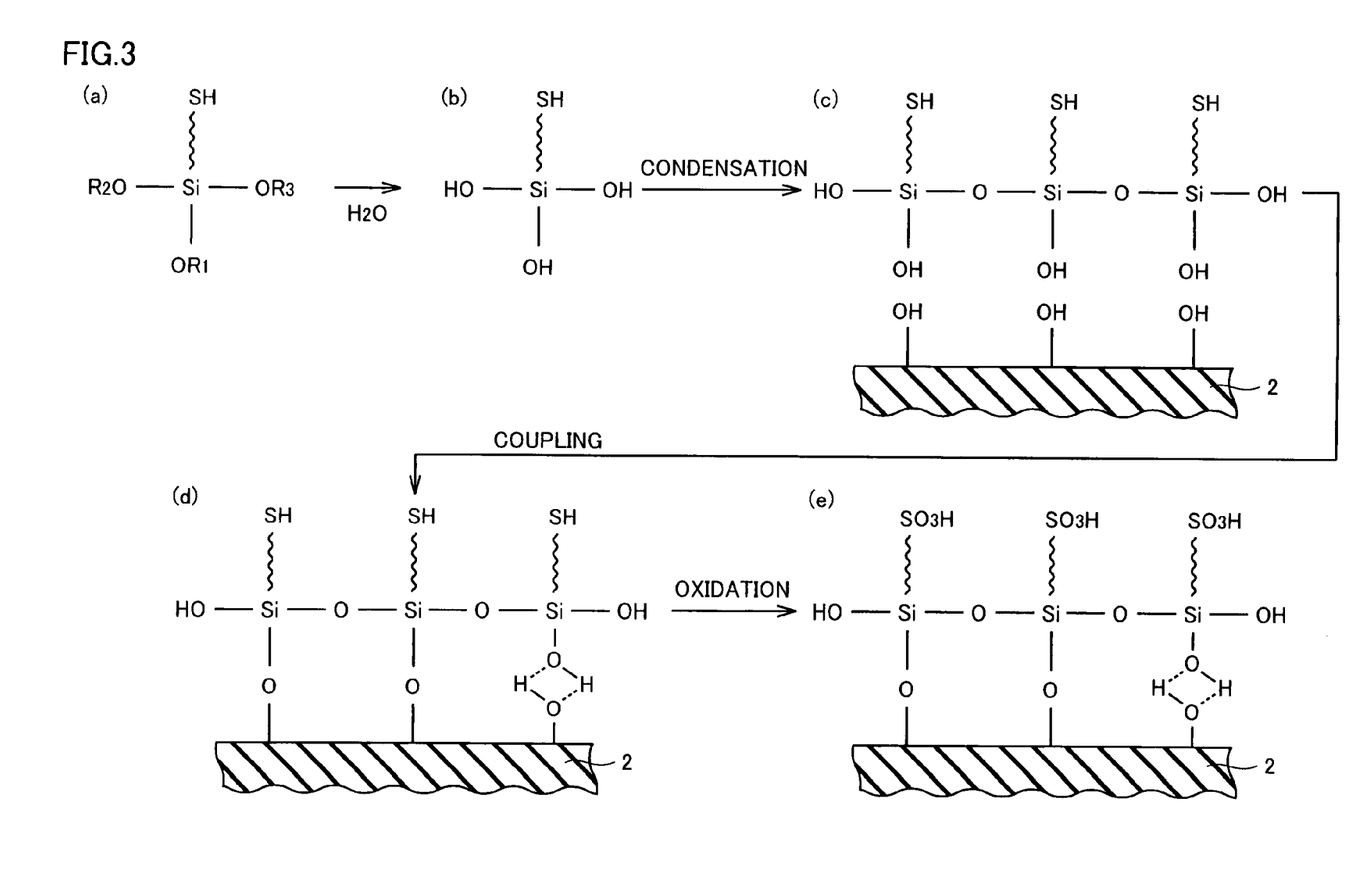
FIG. 3 is a schematic diagram of a reaction process of a silanol derivative for forming a sulfone group-containing silanol derivative layer.

Referring to FIG. 3, a reaction process of the silanol derivative in the step of performing a coupling reaction of the silanol derivative containing the functional group forming a sulfone group by oxidation with at least a portion of the dielectric oxide coating and oxidizing the silanol derivative to form the sulfone group-containing silanol derivative layer in each of the two methods of manufacturing a solid electrolytic capacitor will now be described. In the following description, a silanol derivative including a mercapto group is used as the silanol derivative containing the functional group forming a sulfone group by oxidation. In chemical structural formulas shown in FIG. 3, $R_1$, $R_2$ and $R_3$ respectively represent alkyl groups which may be the same or different from each other, a waved line represents a carbon chain, a solid line represents a covalent bond, and a broken line represents a hydrogen bond.

The coupling reaction of the silanol derivative containing a mercapto group with at least a portion of the dielectric oxide coating can be performed by, for example, immersing an element having the dielectric oxide coating formed thereon in a solution of the silanol derivative containing a mercapto group, which is followed by drying. Referring to FIG. 3, the silanol derivative containing a mercapto group shown in (a) is subjected to hydrolysis in the solution, converted into mercapto group-containing silanol shown in (b), and condensed as shown in (c). When the element having dielectric oxide coating 2 formed thereon is immersed in the solution and then dried, a condensation product of mercapto group-containing silanol is coupled to dielectric oxide coating 2, as shown in (c) and (d). The coupling reaction in the present invention means a reaction of a hydroxyl group of mercapto group-containing silanol and a hydroxyl group on a surface of dielectric oxide coating 2, which results in formation of a covalent bond or a hydrogen bond.

Then, by immersing the element having a mercapto group-containing silanol derivative layer formed thereon in a solution including an oxidizing agent, or by immersing the element having the mercapto group-containing silanol derivative layer formed thereon as a cathode in the polymerization solution for forming the conductive polymer compound layer by electrolytic oxidative polymerization and providing electricity, the sulfone group-containing silanol derivative layer is formed on dielectric oxide coating 2, as shown in (e) of FIG. 3.

Referring to FIG. 1 or 2, in each of the two methods of manufacturing a solid electrolytic capacitor, carbon layer 8 containing conductive carbon is further formed on conductive polymer compound layer 7 formed with first conductive polymer compound layer 3 and second conductive polymer compound layer 5, and cathode extraction layer 9 formed with silver paste or the like is formed on carbon layer 8 to construct capacitor element 10. Furthermore, anode terminal 21 is connected to anode lead member 11 inserted into anode body 1 from one end surface thereof, cathode terminal 22 is connected to cathode extraction layer 9, and capacitor element 10 is covered and sealed with exterior resin 12 such as an epoxy resin to obtain the solid electrolytic capacitor.

The step of forming dielectric oxide coating 2 on a surface of anode body 1 is performed by oxidizing the surface of anode body 1 formed with a sintered body of a valve metal such as tantalum, niobium, titanium, or aluminum to form an oxide coating which is a dielectric layer. Though a method for forming dielectric oxide coating 2 is not specifically limited, anodic oxidation of anode body 1 in a phosphoric acid solution, for example, is preferably performed.

In addition, though a method for forming first conductive polymer compound layer 3 on a portion of dielectric oxide coating 2 referring to FIG. 1 or a method for forming first conductive polymer compound layer 3 on sulfone group-containing silanol derivative layer 4 referring to FIG. 2 is not specifically limited, chemical oxidative polymerization or electrolytic oxidative polymerization is preferably performed. The chemical oxidative polymerization is a method of oxidative polymerization of monomers using an oxidizing agent, which has an advantage that the conductive polymer compound layer can be formed even in a pore of the anode body. Though the oxidizing agent is not specifically limited, a persulfate such as ammonium persulfate, potassium persulfate or sodium persulfate, a metal halide such as ferric chloride or aluminium chloride, a peroxide such as hydrogen peroxide, or the like is used. The electrolytic oxidative polymerization is a method of oxidative polymerization of monomers on an anode utilizing an oxidation reaction performed on the anode, which has an advantage that a thickness and a physical property of the conductive polymer compound layer can be easily controlled. First conductive polymer compound layer 3 can be formed on a portion of dielectric oxide coating 2 by controlling a polymerization condition such as a concentration of monomers in a polymerization solution, a temperature of the polymerization solution, or a polymerization time in the chemical oxidative polymerization or the electrolytic oxidative polymerization. In the step of forming the conductive polymer compound layer, a dopant is added during polymerization of monomers to develop and enhance conductivity. Though the dopant is not specifically limited as long as it is readily incorporated in the conductive polymer to enhance conductivity thereof, a sulfonic acid such as benzenesulfonic acid, alkyl benzenesulfonic acid, naphthalenesulfonic acid, or alkyl naphthalenesulfonic acid, or a salt thereof is preferably used because it has high conductivity.

In addition, though a method for forming second conductive polymer compound layer 5 on sulfone group-containing silanol derivative layer 4 and first conductive polymer compound layer 3 referring to FIG. 1 or a method for forming second conductive polymer compound layer 5 on first conductive polymer compound layer 3 referring to FIG. 2 is not specifically limited, chemical oxidative polymerization or electrolytic oxidative polymerization is preferably performed.

EXAMPLE 1

Referring to FIG. 1, for anode body 1 of a rectangular parallelepiped of 2.3 mm×1.8 mm×1.0 mm formed with sintered tantalum (Ta), which had anode lead member 11 inserted thereto from one end surface thereof (2.3 mm×1.0 mm), electrolytic oxidation was performed in a phosphoric acid solution of 65° C. by applying a constant voltage of 10 V for 10 hours to form dielectric oxide coating 2. Then, an element formed as such was successively immersed at 25° C. in an ethanol solution including 3.0 M (a concentration in mol/liter, which is the same in the following) of pyrrole for 5 minutes and in a solution including 0.1 M of ammonium persulfate and 0.1 M of alkyl naphthalenesulfonic acid for 5 minutes to form first conductive polymer compound layer 3 on a portion of dielectric oxide coating 2.

Then, the element was immersed in a solution including 0.1 M of 3-mercaptopropyltrimethoxysilane (a silane coupling agent "KBM-803" produced by Shin-Etsu Chemical Co., Ltd.) at 25° C. for 10 minutes, dried at 130° C. for 30 minutes, washed with pure water, and dried again at 100° C. This process was repeated two times to form a mercapto group-containing silanol derivative layer on a portion of dielectric oxide coating 2 on which first conductive polymer compound layer 3 was not formed. The element was then immersed in a 10 mass % hydrogen peroxide solution at 25° C. to oxidize the mercapto group-containing silanol derivative layer to form sulfone group-containing silanol derivative layer 4.

Next, the element was set as an anode in a solution including 0.2 M of pyrrole and 0.2 M of alkyl naphthalenesulfonic acid at 25° C., and a current of 0.5 mA was passed for 3 hours to form second conductive polymer compound layer 5.

Carbon layer 8 containing conductive carbon and cathode extraction layer 9 were then successively formed on second conductive polymer compound layer 5 to construct capacitor element 10. Furthermore, anode terminal 21 was welded to anode lead member 11, cathode terminal 22 was connected to cathode extraction layer 9 with a conductive adhesive, and an outside of capacitor element 10 was covered and sealed with exterior resin 12 formed with an epoxy resin to produce a solid electrolytic capacitor.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 356 mF, 354 mF and 370 mF, respectively. In addition, ESRs measured in the initial state, after application of the constant voltage of 2.5 V at 105° C. for 1000 hours, and after placement in the atmosphere of 90% relative humidity at 60° C. for 500 hours were 18.0 mW, 18.5 mW and 18.3 mW, respectively. The capacitance was measured by a four-terminal method using an LCR meter (an inductance-capacitance-resistance measurement device) at a frequency of 120 Hz. The ESR was measured by the four-terminal method using the LCR meter at a frequency of 100 kHz. Results are shown in Table 1.

EXAMPLE 2

A solid electrolytic capacitor was produced similarly as in example 1 except that, electrolytic oxidative polymerization of second conductive polymer compound layer 5 was performed directly after formation of the mercapto group-containing silanol derivative without oxidizing with the hydrogen peroxide solution. In this example, the mercapto group-containing silanol derivative layer was oxidized to form the sulfone group-containing silanol derivative layer concurrently with the electrolytic oxidative polymerization of second conductive polymer compound layer 5.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 352 mF, 351 mF and 368 mF, respectively. In addition, ESRs measured in the initial state, after application of the constant voltage of 2.5 V at 105° C. for 1000 hours, and after placement in the atmosphere of 90% relative humidity at 60° C. for 500 hours were 17.6 mW, 18.1 mW and 17.8 mW, respectively. Results are shown in Table 1.

EXAMPLE 3

A solid electrolytic capacitor was produced similarly as in example 1 except that, in place of oxidation with the hydrogen peroxide solution after formation of the mercapto group-containing silanol derivative, electrolytic oxidation of the element was performed by application of a constant voltage of 10 V in a phosphoric acid solution at 65° C. for 10 hours to form sulfone group-containing silanol derivative layer 4.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 368 mF, 367 mF and 371 mF, respectively. In addition, ESRs measured in the initial state, after application of the constant voltage of 2.5 V at 105° C. for 1000 hours, and after placement in the atmosphere of 90% relative humidity at 60° C. for 500 hours were 17.0 mW, 17.8 mW and 17.2 mW, respectively. Results are shown in Table 1.

EXAMPLE 4

A solid electrolytic capacitor was produced similarly as in example 1 except that, 3-mercaptopropylmethyldimethoxysilane (a silane coupling agent "KBM-802" produced by Shin-Etsu Chemical Co., Ltd.) was used as the mercapto group-containing silanol derivative.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 362 mF, 360 mF and 374 mF, respectively. In addition, ESRs measured in the initial state, after application of the constant voltage of 2.5 V at 105° C. for 1000 hours, and after placement in the atmosphere of 90% relative humidity at 60° C. for 500 hours were 17.9 mW, 18.9 mW and 18.2 mW, respectively. Results are shown in Table 1.

EXAMPLE 5

A solid electrolytic capacitor was produced similarly as in example 2 except that, 3-mercaptopropylmethyldimethoxysilane (the silane coupling agent "KBM-802" produced by Shin-Etsu Chemical Co., Ltd.) was used as the mercapto group-containing silanol derivative.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 359 mF, 356 mF and 370 mF, respectively. In addition, ESRs measured in the initial state, after application of the constant voltage of 2.5 V at 105° C. for 1000 hours, and after placement in the atmosphere of 90% relative humidity at 60° C. for 500 hours were 17.8 mW, 18.7 mW and 18.1 mW, respectively. Results are shown in Table 1.

EXAMPLE 6

A solid electrolytic capacitor was produced similarly as in example 3 except that, 3-mercaptopropylmethyldimethoxysilane (the silane coupling agent "KBM-802" produced by Shin-Etsu Chemical Co., Ltd.) was used as the mercapto group-containing silanol derivative.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 370 mF, 368 mF and 377 mF, respectively. In addition, ESRs measured in the initial state, after application of the constant voltage of 2.5 V at 105° C. for 1000 hours, and after placement in the atmosphere of 90% relative humidity at 60° C. for 500 hours were 17.3 mW, 17.9 mW and 17.5 mW, respectively. Results are shown in Table 1.

COMPARATIVE EXAMPLE 1

A solid electrolytic capacitor was produced similarly as in example 1 except that, the step of immersing the element having the dielectric oxide coating formed thereon in the solution including the silanol derivative and the step of immersing the element in the 10 mass % hydrogen peroxide solution (oxidation of the silanol derivative) were not performed.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 328 mF, 322 mF and 372 mF, respectively. In addition, ESRs measured in the initial state, after application of the constant voltage of 2.5 V at 105° C. for 1000 hours, and after placement in the atmosphere of 90% relative humidity at 60° C. for 500 hours were 18.4 mW, 19.9 mW and 18.9 mW, respectively. Results are shown in Table 1.

COMPARATIVE EXAMPLE 2

A solid electrolytic capacitor was produced similarly as in example 1 except that, 3-glycidoxypropyltrimethoxysilane (a silane coupling agent "KBM-403" produced by Shin-Etsu Chemical Co., Ltd.), which did not include a functional group forming a sulfone group by oxidation, was used as the silanol derivative, and oxidation of the silanol derivative was not performed.

Capacitances of the solid electrolytic capacitor measured in an initial state, after application of a constant voltage of 2.5 V at 105° C. for 1000 hours, and after placement in an atmosphere of 90% relative humidity at 60° C. for 500 hours were 316 mF, 314 mF and 354 mF, respectively. In addition, ESRs measured in the initial state, after application of the constant voltage of 2.5 V at 105° C. for 1000 hours, and after placement in the atmosphere of 90% relative humidity at 60° C. for 500 hours were 19.6 mW, 20.5 mW and 20.1 mW, respectively. Results are shown in Table 1.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Capacitance (µF) | Initial State | 356 | 352 | 368 | 362 | 359 | 370 | 328 | 316 |
| | 105° C. × 2.5 V × 1000 hr | 354 | 351 | 367 | 360 | 356 | 368 | 322 | 314 |
| | 60° C. × 90% RH × 500 hr | 370 | 368 | 371 | 374 | 370 | 377 | 372 | 354 |
| ESR (mΩ) | Initial State | 18.0 | 17.6 | 17.0 | 17.9 | 17.8 | 17.3 | 18.4 | 19.6 |
| | 105° C. × 2.5 V × 1000 hr | 18.5 | 18.1 | 17.8 | 18.9 | 18.7 | 17.9 | 19.9 | 20.5 |
| | 60° C. × 90% RH × 500 hr | 18.3 | 17.8 | 17.2 | 18.2 | 18.1 | 17.5 | 18.9 | 20.1 |

As is obvious from Table 1, the solid electrolytic capacitor having the sulfone group-containing silanol derivative layer formed between the dielectric oxide coating and the conductive polymer compound layer could have a higher capacitance and a lower ESR as compared to a conventional solid electrolytic capacitor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor using a conductive polymer compound as a solid electrolyte, comprising:
    an anode body;
    a dielectric oxide coating formed on a surface of said anode body;

a sulfone group-containing silanol derivative layer formed on at least a portion of said dielectric oxide coating by a coupling reaction; and a conductive polymer compound layer formed at least on said sulfone group-containing silanol derivative layer.

2. A method of manufacturing a solid electrolytic capacitor using a conductive polymer compound as a solid electrolyte, comprising the steps of:

forming a dielectric oxide coating on a surface of an anode body;

performing a coupling reaction of a silanol derivative containing a functional group forming a sulfone group by oxidation with at least a portion of said dielectric oxide coating; and oxidizing said silanol derivative containing the functional group to form a sulfone group-containing silanol derivative.

3. The method of manufacturing a solid electrolytic capacitor according to claim 2, wherein said functional group is a mercapto group.

4. The method of manufacturing a solid electrolytic capacitor according to claim 3, wherein said silanol derivative containing the functional group is one of 3-mercaptopropylmethyldimethoxysilane and 3-mercaptopropyltrimethoxysilane.

5. The method of manufacturing a solid electrolytic capacitor according to claim 2, wherein said silanol derivative containing the functional group is one of 3-mercaptopropylmethyldimethoxysilane and 3-mercaptopropyltrimethoxysilane.

6. The method of manufacturing a solid electrolytic capacitor according to claim 2, wherein the step of oxidizing said silanol derivative containing the functional group is performed by achieving contact between said silanol derivative containing the functional group and an oxidizing agent.

7. The method of manufacturing a solid electrolytic capacitor according to claim 6, wherein said functional group is a mercapto group.

8. The method of manufacturing a solid electrolytic capacitor according to claim 6, wherein said silanol derivative containing the functional group is one of 3-mercaptopropylmethyldimethoxysilane and 3-mercaptopropyltrimethoxysilane.

9. The method of manufacturing a solid electrolytic capacitor according to claim 2, wherein the step of oxidizing said silanol derivative containing the functional group is performed by electrochemically oxidizing said silanol derivative containing the functional group in an electrolyte solution.

10. The method of manufacturing a solid electrolytic capacitor according to claim 9, wherein said functional group is a mercapto group.

11. The method of manufacturing a solid electrolytic capacitor according to claim 9, wherein said silanol derivative containing the functional group is one of 3-mercaptopropylmethyldimethoxysilane and 3-mercaptopropyltrimethoxysilane.

* * * * *

UNITED STATES PATENT AND TRADEMARK OFFICE
CERTIFICATE OF CORRECTION

PATENT NO.       : 7,126,812 B2
APPLICATION NO.  : 11/248202
DATED            : October 24, 2006
INVENTOR(S)      : Hirata et al.

It is certified that error appears in the above-identified patent and that said Letters Patent is hereby corrected as shown below:

On the Title Page:
in item (54) change "SOLID ELECTROLYTIC CAPACITOR METHOD OF MANUFACTURING THE SAME" to be --SOLID ELECTROLYTIC CAPACITOR AND METHOD OF MANUFACTURING THE SAME--

Signed and Sealed this

First Day of May, 2007

JON W. DUDAS
*Director of the United States Patent and Trademark Office*